Figure 1:
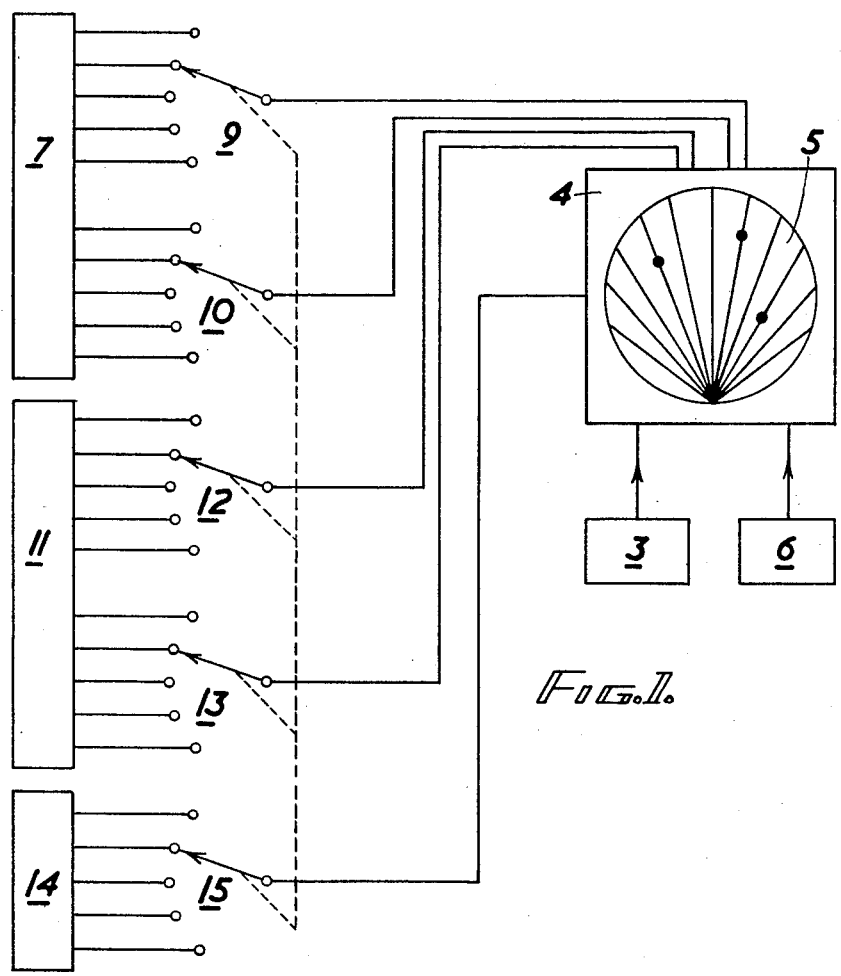

United States Patent Office 2,902,670
Patented Sept. 1, 1959

2,902,670

RADAR SIMULATION OR THE LIKE

Albert Ernest Cutler, Crawley, England, assignor to Communications Patents Limited Application February 1, 1955, Serial No. 485,570

Claims priority, application Great Britain February 9, 1954

5 Claims. (Cl. 340—24)

This invention relates to the indication of the relative positions of ships, aircraft and the like in training exercises.

The relative positions of ships, aircraft or vehicles which are taking part in an exercise can be displayed on a plotting surface by means of markers or light spots, or on the screen of a cathode ray tube. In this way an overall view of the position of a number of craft or vehicles is obtained. Sometimes however an indication is required of the view which would be obtained by a single participant in the exercise, either visually or using radar equipment of limited range.

It is an object of the invention to display the significant aspects of the view available to any participant in the exercise in the relevant form on a cathode ray tube display.

According to one aspect of the invention, apparatus for providing a display of the positions of objects in a selected area, comprises a cathode ray tube, means for applying to a brightness control circuit of the tube video signals representing a view of the positions of objects in an area, means arranged to apply to the deflection circuits of the tube scanning potentials such as to cause a portion only of the view to be displayed on the screen of the tube, means arranged to apply to the deflection circuits of the tube biasing potentials to change the portion of the view which is displayed on the screen and means whereby the biasing potentials are controlled in accordance with the position of an object so that the object appears at a predetermined position in the display.

According to another aspect of the invention, apparatus for providing a display of the positions of objects in a selected area comprises a cathode ray tube, means for applying to a brightness control circuit of the tube video signals representing a view of the positions of objects in an area, means arranged to apply to the deflection circuits of the tube scanning potentials such as to cause a portion only of the view to be displayed on the screen of the tube, means for obtaining potentials representing the co-ordinates of the positions of the objects in the area with respect to a predetermined point, and switching means arranged to apply the co-ordinate potentials pertaining to a selected object to the deflection circuits of the tube so that the selected object appears at a predetermined position in the display.

According to a feature of the invention the electric signals which are applied to the deflection circuits of the tube are such as to cause the selected object to appear in a position other than the center of the display, for example near the edge thereof, the display representing the forward view from the object, symmetrical about its direction of movement.

According to a further feature of the invention, there is provided means controlled in accordance with the heading of the object for rotating the tube so as to bring the line of movement of the object into a predetermined position.

Figure 2:
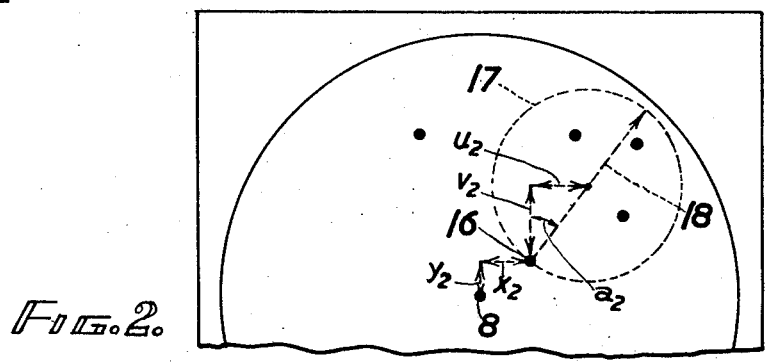

In order that the invention may be better understood, an embodiment thereof will now be described, by way of example only, with reference to the accompanying drawings in which:

Figure 1 shows diagrammatically apparatus for providing on a screen any one of five alternative views, i.e. the forward views from five alternative aircraft, and Figure 2 shows the master display, showing a representation of an aircraft carrier at the centre.

This embodiment will be described in connection with the visual view which would be available to anyone looking forward from the cockpit of an aircraft which is assumed to be controlled from an aircraft carrier for interception purposes.

It will be assumed that a system is available for generating signals suitable for use in producing a cathode ray tube display, constituting a main display and showing the locations or positions of a number of objects in plan view. This system may take the form of a real or simulated radar display, a television picture of a plotting-board or the like. If the sysem does not already include a cathode ray tube display, suitable signals can be generated using a television camera.

In order to establish a cathode ray tube display of the kind mentioned in the preceding paragraph, it is normally necessary to obtain voltages representing the position of each object either relative to a fixed frame or to the position of, for example, an aircraft carrier. In the apparatus to be desribed, it will be assumed that these voltages are available.

In Figure 1, video signals representing a main P.P.I. display of the objects in an area centered on the aircraft carrier are applied directly from the carrier display tube unit 3 to an auxiliary display unit 4 containing the pilot's view tube 5. A time base unit 6 provides the tube 5 with scanning potentials such that only a portion of the main display is reproduced on the tube, this portion being centered on the parent carrier in the absence of further deflection voltages. Means will now be described whereby there are applied to the tube deflection voltages such that the area depicted on the screen of the tube 5 represents the forward view available to the pilot of a selected aircraft, the trace representing this aircraft being bought to the edge of the screen.

A unit 7 provides pairs of electrical signals representing pairs of Cartesian co-ordinates $(x_1 y_1, x_2 y_2 \ldots x_5 y_5)$ of each of the five aircraft with respect to the aircraft carrier 8 (see Figure 2). These signals are in the form of voltages, those representative of $x_1, x_2 \ldots x_5$ being applied respectively to the five fixed contacts of a first bank 9 of a selector switch, and the voltages representing $y_1, y_2 \ldots y_5$ to the five fixed contacts of a second bank 10 of the switch.

A unit 11 provides voltages representing the quantities $u_1 \ldots u_5$ and $v_1 \ldots v_5$ (see Figure 2), these voltages being applied respectively to the fixed contacts of third and fourth banks 12 and 13 respectively of the selector switch. These quantities are defined by the relationships $$u_n = R \sin a_n \text{ and } v_n = R \cos a_n$$

in which R is the range represented by the radius of the tube 5 and $a$ is the heading of the aircraft, $n$ being the identification number of the aircraft.

Finally, electric signals representing the headings of the five aircraft are derived from synchro transmitters in a unit 14 and are applied to further banks of contacts of the selector switch, these being represented by the bank 15.

In Figure 1, the ganged wipers associated with the different banks of the selector switch have been set to the second contacts of these banks. The effect of this is to select the co-ordinate voltages $x_2, y_2$ of the second aircraft 16 (see Figure 2) and to apply them to the deflection circuits of the tube 5, together with the voltages $u_2$, $v_2$, representing the co-ordinates of the centre of the dotted circle 17 (Fig. 2) with respect to the aircraft. This circle, which has for a diameter the dotted arrow 18, indicating the heading of the second aircraft and originating at the position of the latter, represents the pilot's forward view. The voltages $x_2$ and $u_2$ being summed in the deflection circuits of the tube 5, and similarly the voltages $y_2$ and $v_2$, the display is deflected to such an extent that the second aircraft is brought to the edge of the display, with the diameter which passes through the position of the latter aircraft (representing the forward direction or line of movement of the aircraft) making an angle $a$ with the vertical.

A synchro receiver in the unit 4, which receives the heading signals from the banks represented at 15, rotates the tube 5 through an angle $a$ to bring the above-mentioned diameter into a vertical position, so that the position of the selected aircraft is now represented at the bottom of the display. The screen of the tube 5 now shows a representation of the objects which are within the forward view available to the pilot of the selected aircraft.

It should be noted that the lines on the face of the tube 5 do not represent lines of the scanning raster, but merely indicate bearings relative to the heading of the aircraft.

If the deflection potentials were such as to bring the selected aircraft to the centre of the tube (i.e. $x_2$ and $y_2$, without $u_2$ and $v_2$), a masking system, rotatable in accordance with the heading of the aircraft, could be used if it were desired to confine the display to that available looking forward from the aircraft.

The range within which objects are assumed to be visible to the pilot can be adjusted by expanding the picture on the screen, i.e. by suitably adjusting the amplitude of the scanning potentials applied to the tube 5 from the time base unit 6, and simultaneously adjusting the factor R in the unit 11 computing the quantities $u$ and $v$.

For a detailed description of display systems known in the art, reference may be made to the book entitled "Cathode-Ray Tube Displays," by Soller, Starr and Valley, which is a book from the M.I.T. Radiation Laboratory Series, published by the McGraw-Hill Publishing Co., in 1948. Page 429 of this book refers to "Expanding Displays" in general, while page 482 shows the derivation of a sector display. This sector display is similar to that shown on pilot's view tube 5 in Figure 1 of applicant's drawing which is derived from a radial display, such as shown in Figure 2 of the applicant's drawing.

What I claim is:

1. Apparatus for selecting from a main display of a plurality of objects, said main display corresponding to a view observable from a first location, an auxiliary display corresponding to a view observable from a selected one of said objects, comprising a cathode ray tube, means serving to apply to said tube signals representative of the main display, means arranged to apply to deflection circuits of said tube scanning potentials such as to cause a portion only of said view to be displayed on said tube, means for obtaining potentials representing the co-ordinates of the position of each said object with respect to a predetermined point, and switching means arranged to apply the co-ordinate potentials pertaining to a selected object to said deflection circuits so that the selected object appears in a predetermined position of the cathode ray tube.

2. Apparatus as claimed in claim 1, comprising means arranged to provide further co-ordinate potentials which are functions of the size of the cathode ray tube and the heading of the objects and switching means arranged to apply said further co-ordinate potentials pertaining to said selected craft to said deflection circuits in addition to the potentials representing the position of said selected object, whereby the latter is displayed eccentrically on the cathode ray tube and the display is symmetrical about the assumed line of movement of said selected object.

3. Apparatus as claimed in claim 1 comprising means arranged to rotate said display in accordance with the heading of the selected object so that the heading of the said object is in a predetermined direction in relation to said display.

4. Apparatus for selecting from a main display of a plurality of objects corresponding to a view observable from a first location, an auxiliary view corresponding to a view observable from a selected one of said objects, comprising a cathode ray tube, means for applying to said tube signals representative of the main display, means for applying to deflection circuits of said tube scanning potentials for causing a portion only of said main display to be displayed on said tube, means for obtaining potentials representing the Cartesian co-ordinates of the position of each said objects with respect to a first predetermined object, means for obtaining potentials representative of the polar co-ordinates of a second predetermined object with respect to a predetermined point, and switching means arranged to apply the co-ordinate potentials to said deflection circuits whereby said second predetermined object appears in a predetermined position on the cathode ray tube.

5. Apparatus as claimed in claim 4, further comprising means to rotate said auxiliary display in accordance with the heading of said second predetermined object whereby the heading of said object is oriented in a predetermined direction in relation to said display.

References Cited in the file of this patent

UNITED STATES PATENTS

| | | |
|---|---|---|
| 2,413,300 | Dunn et al. | Dec. 31, 1946 |
| 2,433,860 | McDowell | Jan. 6, 1948 |
| 2,449,549 | Byrne | Sept. 12, 1948 |
| 2,588,916 | Field et al. | Mar. 11, 1952 |
| 2,663,868 | Trasker | Dec. 22, 1953 |
| 2,711,479 | Lewinter | June 21, 1955 |
| 2,804,613 | Haworth | Aug. 27, 1957 |